(12) United States Patent
Yamaoka et al.

(10) Patent No.: US 7,620,192 B2
(45) Date of Patent: Nov. 17, 2009

(54) ELECTRET COVERED WITH AN INSULATED FILM AND AN ELECTRET CONDENSER HAVING THE ELECTRET

(75) Inventors: Tohru Yamaoka, Osaka (JP); Hiroshi Ogura, Tokyo (JP); Yuichi Miyoshi, Osaka (JP); Tomoyuki Sasaki, Kyoto (JP)

(73) Assignee: Panasonic Corporation, Osaka (JP)

( * ) Notice: Subject to any disclaimer, the term of this patent is extended or adjusted under 35 U.S.C. 154(b) by 432 days.

(21) Appl. No.: 10/576,518

(22) PCT Filed: Nov. 12, 2004

(86) PCT No.: PCT/JP2004/016835

§ 371 (c)(1),
(2), (4) Date: Apr. 20, 2006

(87) PCT Pub. No.: WO2005/050680

PCT Pub. Date: Jun. 2, 2005

(65) Prior Publication Data
US 2007/0029894 A1 Feb. 8, 2007

(30) Foreign Application Priority Data
Nov. 20, 2003 (JP) ............................. 2003-390554
Jan. 28, 2004 (JP) ............................. 2004-019616
Sep. 1, 2004 (JP) ............................. 2004-253894

(51) Int. Cl.
*H04R 25/00* (2006.01)
(52) U.S. Cl. ..................................... 381/175; 381/174
(58) Field of Classification Search ................. 381/113, 381/116, 174, 175, 190, 181; 367/170, 181; 29/594
See application file for complete search history.

(56) References Cited

U.S. PATENT DOCUMENTS

| | | | |
|---|---|---|---|
| 3,946,422 A | 3/1976 | Yagi et al. |
| 4,142,073 A | 2/1979 | Agneus et al. |
| 4,441,038 A | 4/1984 | Tanaka et al. |
| 5,452,268 A | 9/1995 | Bernstein |
| 5,490,220 A | 2/1996 | Loeppert |
| 5,677,965 A | 10/1997 | Moret et al. |
| 6,383,832 B1 | 5/2002 | Nakabayashi |
| 6,479,878 B1 | 11/2002 | Okawa et al. |
| 6,586,163 B1 | 7/2003 | Okabe et al. |

(Continued)

FOREIGN PATENT DOCUMENTS

CN      2061748 U      9/1990

(Continued)

OTHER PUBLICATIONS

Japanese Office Action, with English translation, issued in Japanese Patent Application JP 2005-515593, mailed Mar. 11, 2008.

(Continued)

*Primary Examiner*—Brian Ensey
(74) *Attorney, Agent, or Firm*—McDermott Will & Emery LLP

(57) ABSTRACT

A silicon nitride film (103) and a silicon nitride film (106) are formed to cover a charged silicon oxide film (105) serving as an electret.

28 Claims, 5 Drawing Sheets

U.S. PATENT DOCUMENTS

| | | | |
|---|---|---|---|
| 6,622,368 B1 * | 9/2003 | Mullenborn et al. | .......... 29/594 |
| 6,731,766 B2 * | 5/2004 | Yasuno et al. | ............... 381/171 |
| 6,847,090 B2 | 1/2005 | Loeppert | |
| 6,859,542 B2 * | 2/2005 | Johannsen et al. | .......... 381/174 |
| 6,870,937 B1 | 3/2005 | Hirosaki et al. | |
| 6,928,178 B2 | 8/2005 | Chang | |
| 7,039,202 B1 | 5/2006 | Takeuchi | |
| 7,386,136 B2 | 6/2008 | Ohbayashi et al. | |
| 2001/0033670 A1 | 10/2001 | Tai et al. | |
| 2002/0081846 A1 | 6/2002 | Haruhana et al. | |
| 2002/0180047 A1 | 12/2002 | Haruhana et al. | |
| 2002/0181725 A1 | 12/2002 | Johannsen et al. | |
| 2003/0007655 A1 | 1/2003 | Yun et al. | |
| 2003/0015798 A1 | 1/2003 | Haruhana et al. | |
| 2003/0026443 A1 | 2/2003 | Yasuno et al. | |
| 2003/0172382 A1 | 9/2003 | Kim | |
| 2004/0114775 A1 | 6/2004 | Chang | |
| 2004/0259286 A1 | 12/2004 | Dehe et al. | |
| 2005/0254673 A1 | 11/2005 | Hsieh et al. | |
| 2006/0145570 A1 | 7/2006 | Ohbayashi et al. | |
| 2007/0189555 A1 | 8/2007 | Yamaoka et al. | |
| 2007/0217635 A1 | 9/2007 | Ogura et al. | |

FOREIGN PATENT DOCUMENTS

| | | |
|---|---|---|
| CN | 2279929 | 4/1998 |
| CN | 1299152 A | 6/2001 |
| JP | 57-14296 | 1/1982 |
| JP | 06-217397 | 8/1994 |
| JP | 7-50899 | 2/1995 |
| JP | 09-283373 * | 10/1997 |
| JP | 11-331988 A | 11/1999 |
| JP | 2001-051424 A | 2/2001 |
| JP | 2001-231098 | 8/2001 |
| JP | 2001-231099 | 8/2001 |
| JP | 2002-027595 | 1/2002 |
| JP | 2002-33241 | 1/2002 |
| JP | 2002-518913 | 6/2002 |
| JP | 2002-198370 | 7/2002 |
| JP | 2002-223499 | 8/2002 |
| JP | 2002-315097 | 10/2002 |
| JP | 2002-320294 | 10/2002 |
| JP | 2002-335599 | 11/2002 |
| JP | 2002-345088 | 11/2002 |
| JP | 2003-031820 | 1/2003 |
| JP | 2003-47095 | 2/2003 |
| JP | 2004-510373 A | 4/2004 |
| JP | 2004-166262 | 6/2004 |
| WO | WO 99/65277 | 12/1999 |
| WO | WO 02/37893 A1 | 5/2002 |

OTHER PUBLICATIONS

United States Office Action issued in U.S. Appl. No. 10/591,456 dated on Sep. 4, 2008.

Japanese Office Action issued in Patent Application No. JP2006-510648 dated on Jul. 29, 2008.

United States Office Action issued in U.S. Appl. No. 10/591,597 dated on Sep. 26, 2008.

United States Office Action issued in U.S. Appl. No. 10/591,456, mailed Jan. 29, 2009.

European Search Report issued in European Patent Application No. EP 04818870.0, mailed Mar. 12, 2009.

Majamaa, T., et al., "Effect of Oxidation Temperature on the Electrical Characteristics of Ultrathin Silicon Dioxide Layers Plasma Oxidized in Ultrahigh Vacuum", Physics Scripta, 1999, pp. 259-262, vol. T79.

Ross, E.C., et al., "Effects of Silicon Nitride Growth Temperature on Charge Storage in the MNOS Structure", Applied Physics Letters, Dec. 15, 1969, pp. 408-409, vol. 15 No. 12.

Chinese Office Action, with its English translation, issued in Chinese Patent Application No. 200480034059.7, dated Jun. 19, 2009.

United States Office Action issued in U.S. Appl. No. 10/591,597 mailed Apr. 8, 2009.

* cited by examiner (a)

(b)

ELECTRET COVERED WITH AN INSULATED FILM AND AN ELECTRET CONDENSER HAVING THE ELECTRET

This application is the U.S. National Phase under 35 U.S.C. § 371 of International Application No. PCT/JP2004/016835, filed Nov. 12, 2004, which in turn claims the benefit of Japanese Application No. 2003-390554, filed Nov. 20, 2003, Japanese Application No. 2004-019616, filed Jan. 28, 2004, and Japanese Application No. 2004-253894, filed Sep. 1, 2004, the disclosures of which Applications are incorporated by reference herein in their entirety.

TECHNICAL FIELD

The present invention relates to an electret condenser having a vibrating electrode and a fixed electrode and, more particularly, to an electret condenser formed by using a MEMS (Micro Electro Mechanical Systems) technology.

BACKGROUND ART

Organic high-molecular polymers such as FEP (Copolymer of Tetrafluoroethylene (TFE) and Hexafluoropropylene (HFP)) materials have been used conventionally for electret elements which are dielectric materials each having a permanent electric polarization and applied to devices such as a condenser microphone. However, since these materials are inferior in thermal resistance, the problem has been encountered that they are difficult to use as elements for reflow when mounted on substrates.

As a solution to the problem, an electret using a silicon oxide film as shown in Patent Document 1, instead of an organic high-molecular polymer, has been proposed in recent years to provide a thinner-film and smaller-size electret by using a microfabrication technology.

Specifically, the technology shown in Patent Document 1 deposits a silicon oxide film on a surface of a base, sets a gas atmosphere containing oxygen and containing no moisture in a deposition chamber without releasing the chamber to an ambient atmosphere, performs a thermal process at 200° C. to 400° C. with respect to the silicon oxide film in the atmosphere, and then performs a charging process with respect to the silicon oxide film.

Patent Document 1: Japanese Laid-Open Patent Publication No. 2002-33241

DISCLOSURE OF THE INVENTION

Problem to be Solved by the Invention

However, an electret has the problem of losing charge upon contact with a liquid. For example, when electretized FEP is immersed in ethanol, a charge in the FEP is significantly reduced, though the charge does not become zero. According to an experiment conducted by the present inventors, when FEP (specifically, FEP formed on a stainless steel substrate to have a thickness of 12.5 μm) of which the surface potential indicating an amount of charge was 300 V was immersed in ethanol, the surface potential was reduced to the order of several volts. It is to be noted that this phenomenon similarly occurs even when the electret is immersed not only in ethanol but also in another organic solvent or water. In terms of the material also, the phenomenon is not peculiar to FEP but similarly occurs in a general electret material such as a silicon oxide film.

In view of the foregoing, it is therefore an object of the present invention to provide an element to which an electret condenser has been applied and which has a structure excellent in moisture resistance, such as an ECM (electret condenser microphone). Another object of the present invention is to provide a small-size ECM which does not require a charge supply circuit by producing an ECM composed of an electret having a permanent charge by using a MEMS technology.

Means for Solving the Problem

To attain the objects described above, an electret according to the present invention comprises a charged silicon oxide film and an insulating film formed to cover the silicon oxide film.

A first electret condenser according to the present invention comprises: a first electrode formed with through holes; a second electrode disposed with an air gap interposed between itself and the first electrode; and an electret composed of a charged silicon oxide film formed on a surface of the second electrode which is opposing the first electrode, wherein an insulating film is formed to cover the silicon oxide film.

A second electret condenser according to the present invention comprises: a fixed film having a first electrode and formed with first through holes; a second electrode disposed with an air gap interposed between itself and the fixed film; and an electret composed of a charged silicon oxide film formed on a surface of the second electrode which is opposing the fixed film, wherein an insulating film is formed to cover the silicon oxide film.

A third electric condenser according to the present invention comprises: a semiconductor substrate having a region removed to leave a peripheral portion thereof; and a vibrating film formed on the semiconductor substrate to cover the region, wherein the vibrating film has a multilayer structure composed of an electret, an electrode film, a first insulating film, and a second insulating film and said electret is covered with each of the first insulating film and the second insulating film.

The electret and electret condenser according to the present invention allows protection of the surfaces of the charged silicon oxide film, i.e., the upper, lower, and side surfaces thereof with the insulating film. Specifically, by covering the silicon oxide film which shows remarkable absorption of atmospheric moisture or the like with the insulating film to prevent the surfaces thereof from being exposed to an ambient atmosphere, it becomes possible to suppress a reduction in the amount of charge in the charged (electretized) silicon oxide film. This allows an improvement in the reliability of the electret.

In the electret and electret condenser according to the present invention, the insulating film need not directly cover a surface of the charged silicon oxide film (electret), e.g., the upper or lower surface thereof. For example, an electrode may also be interposed between the lower surface of the silicon oxide film and the insulating film.

In the electret and electric condenser according to the present invention, the insulating film covering the charged silicon oxide film (electret) preferably has a higher moisture resistance than the silicon oxide film. More specifically the moisture resistance (resistance to charge loss in a given humidity state such as, e.g., a moisture resistance test) of the silicon oxide film covered with the insulating film is higher than that of the silicon oxide film uncovered with the insulating film. As the insulating film having a higher moisture resistance than the silicon oxide film, there can be used, e.g., a silicon nitride film.

Effect of the Invention

In accordance with the present invention, there can be provided an element to which an electret condenser has been applied and which has an electret structure excellent in moisture resistance, such as an ECM. By producing such an ECM by using a MEMS technology, it becomes possible to provide a small-size ECM which does not require a charge supply circuit. Thus, the present invention renders it possible to implement a high-reliability, small-size, and high-performance microphone. In addition, it also becomes possible to widely supply various practical devices each equipped with the microphone to a society.

BRIEF DESCRIPTION OF THE DRAWINGS

FIG. 1(b) is a cross-sectional view of the ECM;

DESCRIPTION OF NUMERALS

Figure 1:
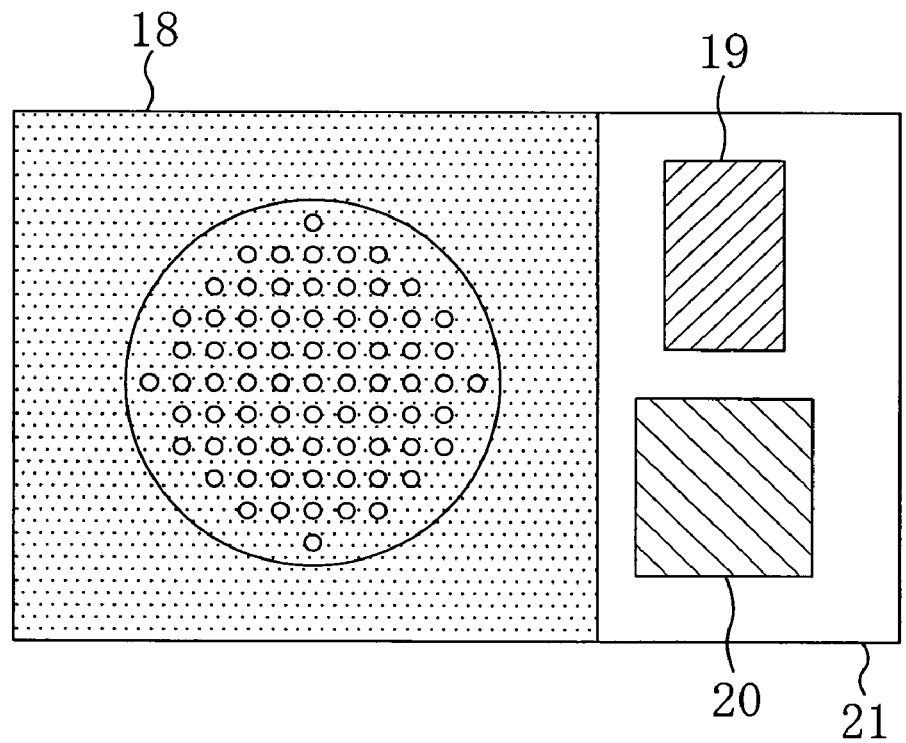
FIGS. 1(a) and 1(b) are structural views of an ECM according to an embodiment of the present invention, of which 1(a) is a plan view of the ECM
Figure 1:
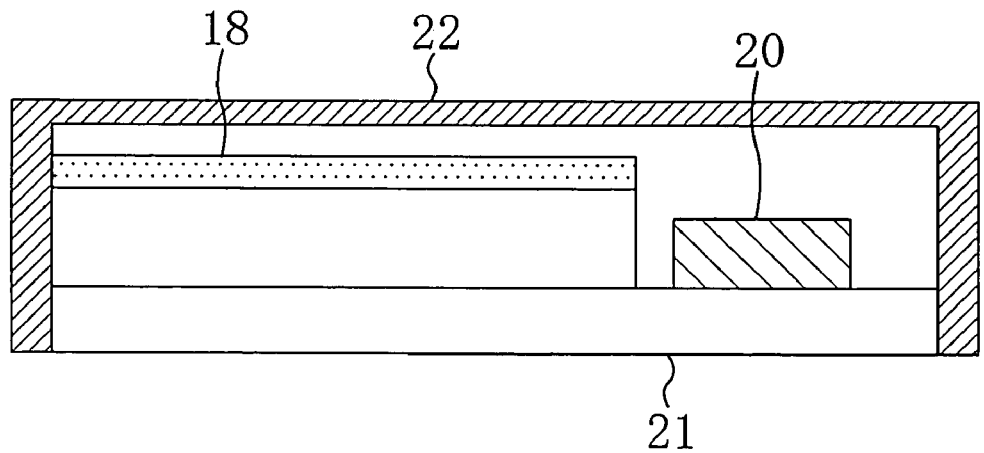

18 Microphone Portion
19 SMD
20 FET Portion
21 Printed Board
22 Case for ECM
23 Internal Circuit of ECM
24 Output Terminal
25 Output Terminal
26 External Terminal
27 External Terminal
28 Terminal
29 Terminal
30 Terminal
101 Semiconductor Substrate
102 Silicon Oxide Film
103 Silicon Nitride Film
104 Lower Electrode
105 Silicon Oxide Film
106 Silicon Nitride Film
107 Leak Hole
108 Silicon Oxide Film
109 Air Gap
110 Fixed Film
111 Acoustic Hole
112 Vibrating Film
113 Membrane Region
114 Silicon Nitride Film
115 Extraction Wiring
116 Opening
117 Opening
118 Conductive Film
119 Silicon Nitride Film

BEST MODE FOR CARRYING OUT THE INVENTION

Embodiment

Referring to the drawings, an electret condenser according to an embodiment of the present invention will be described by using the case where it is applied to an ECM as an example.

A description will be given first to the ECM as an element to which the electret condenser according to the present embodiment has been applied.

FIGS. 1(a) and 1(b) are structural views of the ECM according to the present embodiment, of which FIG. 1(a) is a plan view of the ECM and FIG. 1(b) is a cross-sectional view of the ECM.

As shown in FIGS. 1(a) and 1(b), the ECM according to the present embodiment is comprised of: a microphone portion 18; a SMD (Surface Mounted Device) 19 such as a condenser; and a FET (Field Effect Transistor) portion 20 which are mounted on a printed board 21. As shown in FIG. 1(b), the printed board 21 with the microphone portion 18, the SMD 19, and the FET portion 20 mounted thereon is protected by a case 22, though the depiction thereof is omitted in FIG. 1(a).

Figure 2:
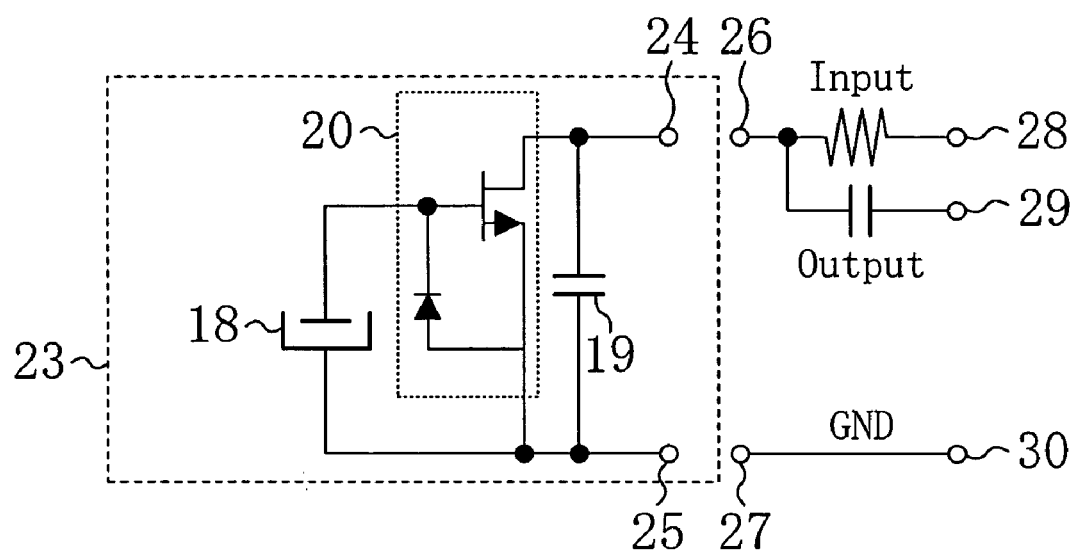
FIG. 2 is a circuit block diagram of the ECM according to the embodiment.

FIG. 2 is a circuit block diagram of the ECM according to the present embodiment.

As shown in FIG. 2, the internal circuit 23 of the ECM according to the present embodiment is comprised of: the microphone portion 18 composed of an electret condenser according to the present embodiment, which will be described later; the SMD 19; and the FET portion 20. From the output terminals 24 and 25 of the internal circuit 23, respective signals are outputted to external terminals 26 and 27. During actual operation, when a signal having a voltage of, e.g., about 2 V is inputted from the terminal 28 which is connected to the external terminal 26 via a resistor, a signal having an AC voltage of, e.g., several tens of microvolts is outputted to the terminal 29 which is connected to the external terminal 26 via a condenser. Each of the external terminal 27 and the terminal 30 connected thereto is connected to the output terminal 25 as the GND terminal in the ECM internal circuit 23.

Figure 3:
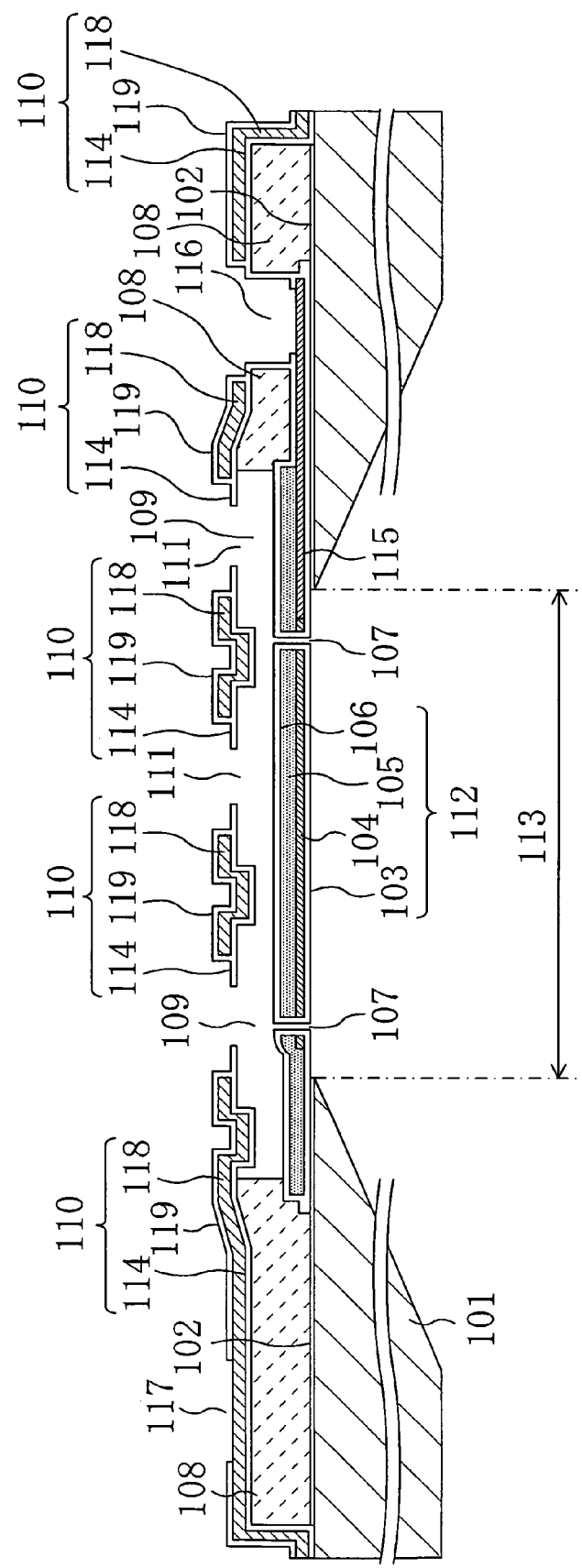
FIG. 3 is a cross-sectional view of an electret condenser composing the ECM according to the embodiment.

A description will be given herein below to the electret condenser according to the present embodiment. FIG. 3 is a cross-sectional view of the electret condenser according to the present embodiment.

As shown in FIG. 3, the electret condenser according to the present embodiment has a parallel-plate condenser structure which uses, as electrodes, a vibrating film 112 formed above a semiconductor substrate 101 having a region (hereinafter referred to as a membrane region 113) removed to leave the peripheral portion thereof such that the membrane region 113 is covered with the vibrating film 112 and a fixed film 110 disposed with an air gap 109 interposed between itself and the vibrating film 112. The vibrating film 112 has a lower electrode 104, while the fixed film 110 has a conductive film (upper electrode) 118.

In the electret condenser according to the present embodiment, when the vibrating film 112 receives a sound pressure from above through a plurality of acoustic holes 111 provided in the fixed film 110 and the air gap 109, the vibrating film 112 mechanically vibrates upward and downward in response to the sound pressure. When the vibrating film 112 vibrates, the distance (distance between the electrodes) between the vibrating film 112 (i.e., the lower electrode 104) and the fixed film 110 changes so that the capacitance (C) of the condenser changes accordingly. Since a charge (Q) accumulated in the condenser is constant, the change in the capacitance (C) of the condenser causes a change in the voltage (V) between the lower electrode 104 and the fixed film 110. The reason for this is that a condition given by the following numerical expression should be physically satisfied.

$$Q = C \cdot V \quad (1)$$

Because the lower electrode 104 is electrically connected to the gate of the FET portion 20 of FIG. 2, the gate potential of the FET portion 20 changes with the vibration of the vibrating film 112. The change in the gate potential of the FET portion 20 is outputted as a voltage change to the external output terminal 29.

A detailed structure of the electret condenser according to the present embodiment is as follows.

As shown in FIG. 3, a silicon oxide film 102 is formed on the semiconductor substrate 101 on which the electret condenser according to the present embodiment is mounted and the membrane region 113 is formed by partially removing the semiconductor substrate 101 and the silicon oxide film 102 such that the respective peripheral portions thereof remain. Thus, the membrane region 113 is a region formed by partially removing the semiconductor substrate 101 such that the peripheral portion thereof remains to allow the vibrating film 112 to vibrate on receiving a pressure from the outside.

On the silicon oxide film 102, the silicon nitride film 103 is formed to cover the membrane region 113. On the silicon nitride film 103, the lower electrode 104 and extraction wiring 115, each composed of the same conductive film, are formed. The lower electrode 104 is formed on the silicon nitride film 103 covering the membrane region 113 and a vicinity region thereof (a part of an external region of the membrane region 113). The extraction wiring 115 is formed on the portion of the silicon nitride film 103 which is located outside the membrane region 113 to be connected to the lower electrode 104.

Over each of the silicon nitride film 103, the lower electrode 104, and the extraction wiring 115, a silicon oxide film 105 and a silicon nitride film 106 are formed successively. The vibrating film 112 is constituted herein by the lower electrode 104 composed of the conductive film and the respective portions of the silicon nitride film 103, the silicon oxide film 105, and the silicon nitride film 106 which are located in the membrane region 113. The vibrating film 112 is also formed with a plurality of leak holes 107 each connecting to the air gap 109. Each of the silicon nitride films 103 and 106 is formed to cover the entire surfaces of the lower electrode 104 and the silicon oxide film 105 including the inner wall surfaces of the leak holes 107. The silicon oxide film 105 is an electret film having a charge accumulated therein. Specifically, the charge is injected in the silicon oxide film 105 by exposing the silicon oxide film 105 during a corona discharge or plasma discharge so that the silicon oxide film 105 electretized thereby is formed successfully. At this time, the silicon oxide film 105 may be either exposed or covered with the silicon nitride films 103 and 106 during the corona discharge or plasma discharge.

As shown in FIG. 3, the fixed film 110 composed of the conductive film 118 covered with a lower-layer silicon nitride film 114 and an upper-layer silicon nitride film 119 is further formed above the vibrating film 112, i.e., above the silicon nitride film 106. The air gap 109 is formed between the vibrating film 112 and the fixed film 110 in the membrane region 113 and the vicinity region thereof (a part of the external region of the membrane region 113), while a silicon oxide film 108 is formed between the silicon nitride film 106 or the silicon oxide film 102 and the fixed film 110 in the other region. In other words, the air gap 109 is formed over a region including at least the entire membrane region 113, while the fixed film 110 is supported above the vibrating film 112 by the silicon oxide film 108.

The fixed film 110 located above the air gap 109 is formed with a plurality of acoustic holes 111 each connecting to the air gap 109. An opening 116 is provided in the fixed film 110 including the silicon nitride film 114 and in the silicon oxide film 108 to partially expose the extraction wiring 115. The lower electrode 104 is electrically connected to the gate of the FET portion 20 shown in FIG. 2 via the extraction wiring 115. In addition, an opening 117 is provided in the silicon nitride film 119 composing the fixed film 110 and the conductive film 118 composing the fixed film 110 is exposed therein such that the conductive film 118 is electrically connected thereby to the GND terminal 25 of FIG. 2.

Figure 4:
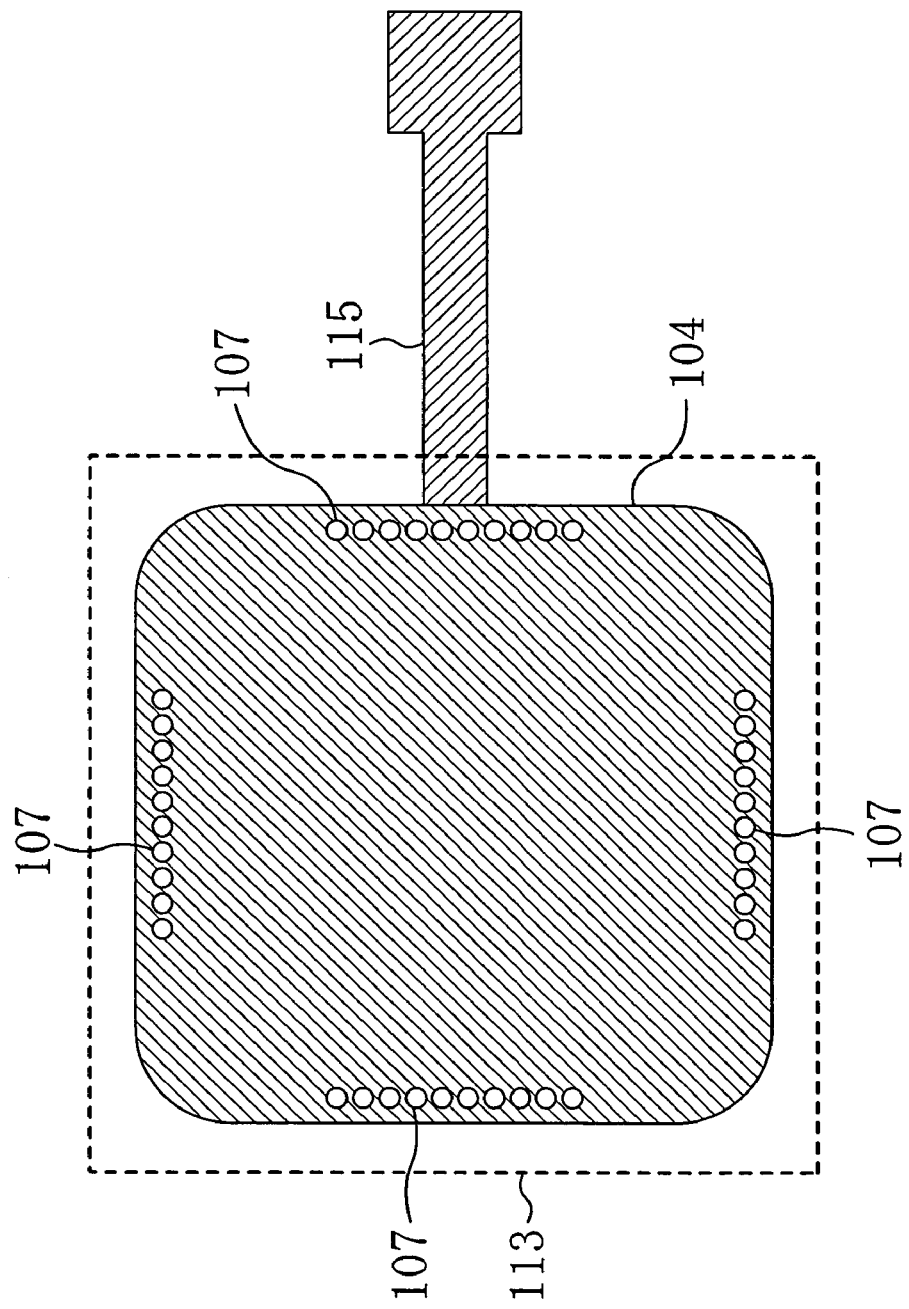
FIG. 4 is a plan view of the lower electrode of the electret condenser composing the ECM according to the embodiment and extraction wiring thereof.

FIG. 4 is a plan view of the lower electrode 104 of the electret condenser according to the present embodiment and the extraction wiring 115 thereof. As stated previously, each of the lower electrode 104 and the extraction wiring 115 is composed of the same conductive film. As shown in FIG. 4, the lower electrode 104 is formed inside the membrane region 113 and the plurality of leak holes 107 are formed in the peripheral portion of the lower electrode 104. The extraction wiring 115 is formed to electrically connect the lower electrode 104 to the outside.

A description will be given herein below to the reason that the lower electrode 104 is formed inside the membrane region 113. The capacitance of the condenser in the ECM is determined by a capacitance component which varies with the vibration of the vibrating film and by a capacitance component which does not vary with the vibration of the vibrating film. When a parasitic capacitance increases, the capacitance component which does not vary with the vibration of the vibrating film increases disadvantageously so that the performance of the ECM is greatly influenced thereby. To prevent this, the present embodiment has provided the lower electrode 104 of the electric condenser inside the membrane region 113. Since the arrangement eliminates the overlapping region between the lower electrode 104 and the semiconductor substrate 101, it is possible to eliminate a large-area MOS (metal oxide semiconductor) capacitance composed of the lower electrode 104, the silicon oxide film 102, and the semiconductor substrate 101. More specifically, the parasitic capacitance can be limited only to a small-area MOS capacitance composed of the extraction wiring 115, the silicon oxide film 102, and the semiconductor substrate 101. As a result, an increase in the capacitance component (parasitic capacitance) which does not vary in the condenser can be prevented and therefore a small-size and high-performance condenser can be implemented.

Of the components of the vibrating film 112 according to the present embodiment, i.e., of the silicon nitride film 103, the lower electrode 104 composed of the conductive film, the silicon oxide film 105, and the silicon nitride film 106, the silicon nitride film 103, the silicon oxide film 105, and the silicon nitride film 106 each formed to cover the membrane region 113 are formed to overlap the semiconductor substrate 101. In other words, the respective end portions of the silicon nitride film 103, the silicon oxide film 105, and the silicon nitride film 106 are located above the semiconductor substrate 101. On the other hand, the lower electrode 104 of the vibrating film 112, which is composed of the conductive film, is formed inside the membrane region 113 not to overlap the semiconductor substrate 101. In other words, the end portion of the lower electrode 104 is located inside the membrane region 113. The arrangement allows the resonant frequency characteristic of the vibrating film 112 to be controlled by adjusting the film thickness of each of the silicon nitride film 103, the silicon oxide film 105, and the silicon nitride film 106. Thus, by allowing easy control of the capacitance component which varies under a pressure from the outside of the condenser, a small-size and high-sensitivity electret condenser can be implemented.

A description will be given herein below to the reason that the silicon nitride films 103 and 106 are formed to cover the lower electrode 104 and the silicon oxide film 105. When the electret composed of the silicon oxide film comes in contact with a liquid, the charge in the electret is significantly reduced. To suppress the reduction in the charge of the electret, the present embodiment has covered at least the surfaces (upper, lower, and side surfaces) of the silicon oxide film 105 serving as the electret with the silicon nitride films 103 and 106. More specifically, the inner wall surfaces of the leak holes 107 are also covered completely with the silicon nitride film 106 such that the silicon oxide film (electret) 105 is not exposed in each of the leak holes 107 formed in the vibrating film 112. As a result, it becomes possible to implement an electret condenser having an electret which is excellent in moisture resistance and heat resistance.

Figure 5:
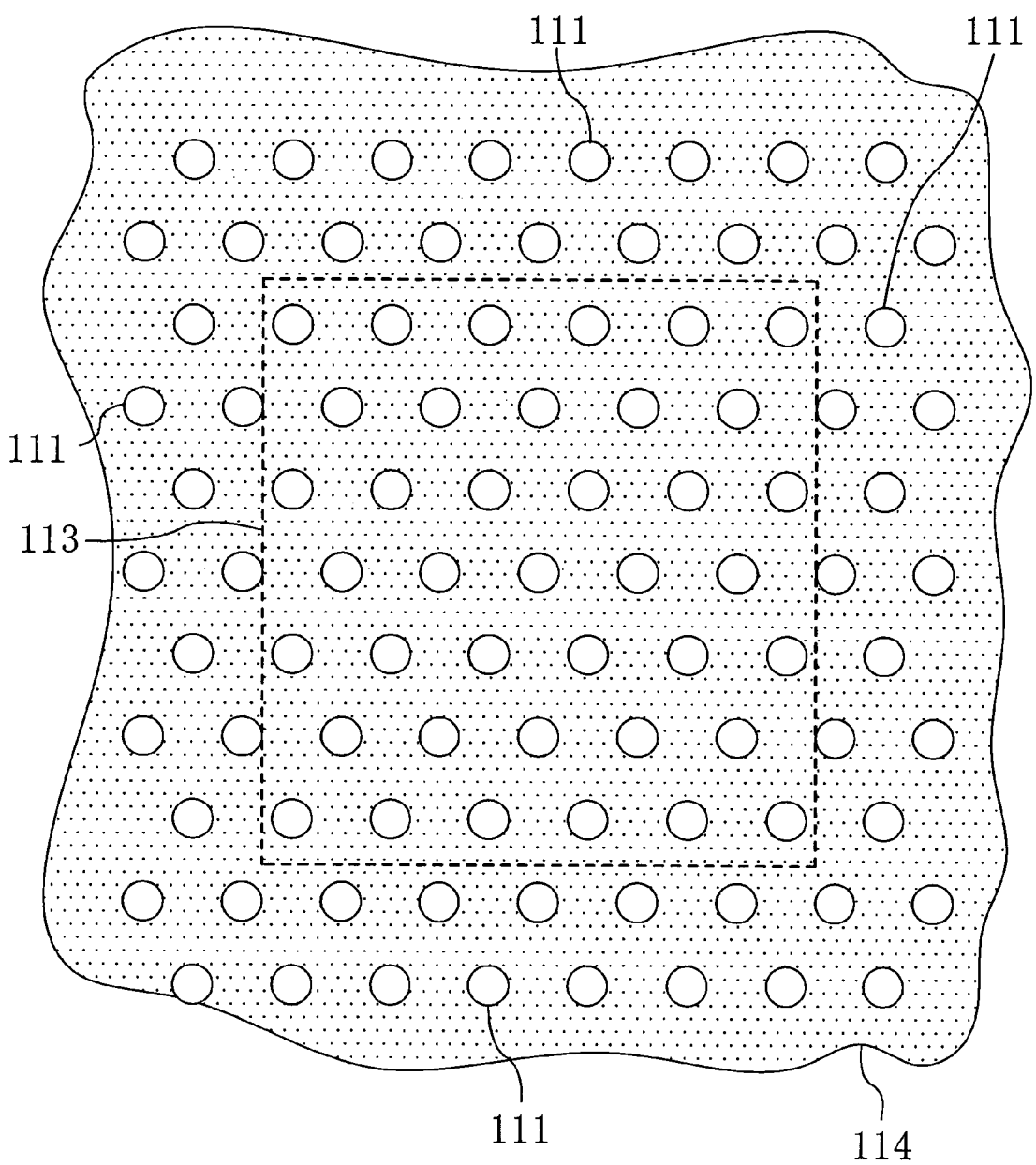
FIG. 5 is a plan view of a silicon nitride film in the fixed film of the electret condenser composing the ECM according to the embodiment.

FIG. 5 is a plan view of the silicon nitride film 114 composing the fixed film 110 of the electret condenser according to the present embodiment. As described above, the plurality of acoustic holes 111 are formed in the fixed film 110 formed above the semiconductor substrate 101 including the membrane region 113. Each of the acoustic holes 111 is located in the membrane region 113 and the vicinity region thereof (a part of the external region of the membrane region 113).

A description will be given herein below to the operation of the electret condenser according to the present embodiment. In the electret condenser according to the present embodiment shown in FIG. 3, when the vibrating film 112 receives a sound pressure from above through the acoustic holes 111 and the air gap 109, it mechanically vibrates upward and downward in response to the sound pressure. The electret condenser according to the present embodiment has a parallel-plate condenser structure using, as the electrodes, the lower electrode 104 composing the vibrating film 112 and the conductor film 118 composing the fixed film 110. Accordingly, when the vibrating film 112 vibrates, the distance between the lower electrode 104 and the conductive film 118 as the electrodes changes to change the capacitance (C) of the condenser. Since the charge (Q) accumulated in the condenser is constant, the change in the capacitance (C) of the condenser causes a change in the voltage (V) between the lower electrode 104 and the fixed film 110 (conductive film 118). The reason for this is that the condition given by the following numerical expression (1) should be physically satisfied.

$$Q = C \cdot V \quad (1)$$

In addition, when the voltage (V) between the lower electrode 104 and the fixed film 110 (conductive film 118) changes, the gate potential of the FET portion 20 also changes because the lower electrode 104 is electrically connected to the gate of the FET portion 20 of FIG. 2. Thus, the vibration of the vibrating film 112 changes the gate potential of the FET portion 20 so that the change in the gate potential of the FET portion 20 is outputted as a voltage change to the external output terminal 29 of FIG. 2.

As described above, the present embodiment allows protection of the charged silicon oxide film 105 with the silicon nitride films 103 and 106. Specifically, by covering the surfaces of the silicon oxide film 105 made of a material showing remarkable absorption of atmospheric moisture or the like with the silicon nitride films 103 and 106 to prevent the silicon oxide film 105 from being exposed to an ambient atmosphere, it becomes possible to suppress a reduction in the amount of charge in the silicon oxide film 105. This allows an improvement in the reliability of the electret. As a result, an electret condenser having an electret structure which is excellent in moisture resistance, such as an ECM, can be provided. By producing such an ECM by using a MEMS technology, a small-size ECM which does not require a charge supply circuit can be provided.

Thus, the present embodiment makes it possible to implement a high-reliability, small-size, and high-performance microphone and also widely supply various practical devices each equipped with the microphone to a society.

Although the present embodiment has covered the lower surface of the charged silicon oxide film 105 with the silicon nitride film 103 with the lower electrode 104 interposed therebetween, the lower surface of the silicon oxide film 105 may also be covered directly with the silicon nitride film.

Although the present embodiment has covered the surface of the charged silicon oxide film 105 with the silicon nitride film, the surface of the charged silicon oxide film 105 may also be covered with an insulating film of another type having a higher moisture resistance than the silicon oxide film instead of the silicon nitride film.

Alternatively, the present embodiment may also use silicon or polysilicon doped with an impurity, gold, a refractory metal, aluminum, an aluminum-containing alloy, or the like as a conductor material composing the lower electrode 104.

Alternatively, the present embodiment may also use silicon or polysilicon doped with an impurity, gold, a refractory metal, aluminum, an aluminum-containing alloy, or the like as the material of the conductive film 118 composing the fixed film 110.

In the present embodiment, a substrate made of an insulating material may also be used instead of the semiconductor substrate 101.

INDUSTRIAL APPLICABILITY

The present invention relates to an electret condenser having a vibrating electrode and a fixed electrode. When applied to an ECM formed by using a MEMS technology or the like, the present invention can particularly improve the performance and reliability of the ECM and is therefore extremely useful.

What is claimed is:

1. An electret comprising:
   a charged silicon oxide film;
   a first insulating film formed to cover upper and side surfaces of the silicon oxide film; and
   a second insulating film formed to cover a lower surface of the silicon oxide film, wherein
   at least one of the first insulating film and the second insulating film is formed to be in contact with at least one of the upper, side, and lower surfaces of the silicon oxide film.

2. The electret of claim 1, wherein each of the first and second insulating films is a silicon nitride film.

3. The electret of claim 1, wherein the silicon oxide film has been charged by a plasma discharge or a corona discharge.

4. The electret of claim 1, wherein the first insulating film is formed to be in contact with the upper and side surfaces of the silicon oxide film.

5. The electret of claim 4, wherein the second insulating film is formed to be in contact with the lower surface of the silicon oxide film.

6. The electret of claim 1, wherein the second insulating film is formed to be in contact with the lower surface of the silicon oxide film.

7. An electret condenser comprising:
a fixed film having a first electrode; and
a vibrating film disposed with an air gap interposed between itself and the fixed film, wherein
the vibrating film has a multilayer structure composed of a charged silicon oxide film, a second electrode, a first insulating film, and a second insulating film,
the silicon oxide film is disposed between the first and second electrodes,
upper and side surfaces of the silicon oxide film are covered with the first insulating film,
a lower surface of the silicon oxide film is covered with the second insulating film, and
at least one of the first insulating film and the second insulating film is formed to be in contact with at least one of the upper, side, and lower surfaces of the silicon oxide film.

8. The electret condenser of claim 7, wherein the lower surface of the silicon oxide film is covered with the second insulating film with the second electrode interposed therebetween.

9. The electret condenser of claim 7, wherein the vibrating film is formed with a plurality of through holes each reaching the air gap and
a surface of the silicon oxide film which forms each of respective inner wall surfaces of the plurality of through holes is covered with the first insulating film.

10. The electret condenser of claim 7, wherein each of the first and second insulating films is a silicon nitride film.

11. The electret condenser of claim 7, wherein each of the first and second electrodes is made of aluminum, an aluminum alloy, silicon, polysilicon, gold, or a refractory metal.

12. The electret condenser of claim 7, wherein an area of the second electrode is smaller than an area of the silicon oxide film.

13. The electret condenser of claim 7, wherein the silicon oxide film has been charged by a plasma discharge or a corona discharge.

14. The electret condenser of claim 7, wherein the first insulating film is formed to be in contact with the upper and side surfaces of the silicon oxide film.

15. The electret condenser of claim 14, wherein the second insulating film is formed to be in contact with the lower surface of the silicon oxide film.

16. The electret condenser of claim 7, wherein the second insulating film is formed to be in contact with the lower surface of the silicon oxide film.

17. An electret condenser comprising:
a semiconductor substrate having a region removed to leave a peripheral portion thereof; and
a vibrating film formed on the semiconductor substrate to cover the region, wherein
the vibrating film has a multilayer structure composed of a charged silicon oxide film, an electrode film, a first insulating film, and a second insulating film,
upper and side surfaces of the silicon oxide film are covered with the first insulating film
a lower surface of the silicon oxide film is covered with the second insulating film, and
at least one of the first insulating film and the second insulating film is formed to be in contact with at least one of the upper, side, and lower surfaces of the silicon oxide film.

18. The electret condenser of claim 17, wherein
the lower surface of the silicon oxide film is covered with the second insulating film with the electrode film interposed therebetween.

19. The electret condenser of claim 17, wherein the electrode film is disposed between the semiconductor substrate and the silicon oxide film.

20. The electret condenser of claim 17, wherein each of the first and second insulating films is a silicon nitride film.

21. The electret condenser of claim 17, wherein the electrode film is formed inside the region in non-overlapping relation with the semiconductor substrate.

22. The electret condenser of claim 17, wherein the first insulating film is formed to be in contact with the upper and side surfaces of the silicon oxide film.

23. The electret condenser of claim 22, wherein the second insulating film is formed to be in contact with the lower surface of the silicon oxide film.

24. The electret condenser of claim 17, wherein the second insulating film is formed to be in contact with the lower surface of the silicon oxide film.

25. An electret comprising:
a charged silicon oxide film;
a first silicon nitride film formed to cover upper and side surfaces of the charged silicon oxide film; and
a second silicon nitride film formed to cover a lower surface of the charged silicon oxide film.

26. The electret of claim 25, wherein the first silicon nitride film is formed to be in contact with the upper and side surfaces of the silicon oxide film.

27. The electret of claim 26, wherein the second silicon nitride film is formed to be in contact with the lower surface of the silicon oxide film.

28. The electret of claim 25, wherein the second silicon nitride film is formed to be in contact with the lower surface of the silicon oxide film.

* * * * *

UNITED STATES PATENT AND TRADEMARK OFFICE
CERTIFICATE OF CORRECTION

| | |
|---|---|
| PATENT NO. | : 7,620,192 B2 |
| APPLICATION NO. | : 10/576518 |
| DATED | : November 17, 2009 |
| INVENTOR(S) | : Tohru Yamaoka et al. |

It is certified that error appears in the above-identified patent and that said Letters Patent is hereby corrected as shown below:

Page 2, In Item (56) "References Cited," under "Foreign Patent Documents,"

Please add the reference --JP 2002-209298    07/2002.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,620,192 B2  Page 1 of 1
APPLICATION NO. : 10/576518
DATED : November 17, 2009
INVENTOR(S) : Yamaoka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 643 days.

Signed and Sealed this

Twenty-sixth Day of October, 2010

David J. Kappos
*Director of the United States Patent and Trademark Office*